Dec. 12, 1950 F. M. MARTINEZ 2,533,384

APPARATUS FOR ENCIPHERING AND DECIPHERING CRYPTOGRAPHIC COMMUNICATIONS

Filed June 9, 1949 2 Sheets-Sheet 1

Inventor
Francisco Miranda Martinez
By Ira Milton Jones
Attorney

Dec. 12, 1950 F. M. MARTINEZ 2,533,384

APPARATUS FOR ENCIPHERING AND DECIPHERING CRYPTOGRAPHIC COMMUNICATIONS

Filed June 9, 1949 2 Sheets-Sheet 2

Inventor
Francisco Miranda Martinez
By Ira Milton Jones
Attorney

Patented Dec. 12, 1950

2,533,384

UNITED STATES PATENT OFFICE 2,533,384

APPARATUS FOR ENCIPHERING AND DECIPHERING CRYPTOGRAPHIC COMMUNICATIONS

Francisco Miranda Martinez, Alcala de Guadaira-Sevilla, Spain

Application June 9, 1949, Serial No. 98,004
In Spain June 14, 1948

6 Claims. (Cl. 35—2)

This invention relates to the art of enciphering and deciphering cryptographic communications and has as an object to provide a convenient device or apparatus for practicing the enciphering and deciphering method disclosed in the copending application of Francisco Miranda Martinez, Serial No. 98,005, filed June 9, 1949.

Another object of this invention is to provide a device or apparatus for enciphering cryptographic communications in such a manner that deciphering thereof by a recipient is only possible through his knowledge in advance of the key or conditions under which they were enciphered.

Another object of this invention is the provision of an apparatus by means of which the key for enciphering the communication can be easily and rapidly changed so that it is imperative that the recipient know the sequence and nature of the changes in order to decipher the communication and also have a duplicate apparatus.

The method for which the apparatus of this invention is designed is characterized by the fact that the letters or other intelligence conveying characters which would normally be used to write a communication are represented by cryptographic characters as, for instance, common numbers, chosen from a plurality of series of such cryptographic characters with the cryptographic characters selected from the different series thereof in accordance with a prearranged sequence of variation between the different cryptographic character series. Thus the frequency with which any given cryptographic character recurs in a communication is no clue to the letter or intelligence conveying character which it represents. The secrecy which the method affords is further assured by prearranged changes in the locations of the individual letters or intelligence conveying characters in the row or series thereof.

While various devices and apparatus may be devised for the practice of this method the device or apparatus of this invention provides an exceptionally facile expedient for this purpose which will appear as the description proceeds, it being understood that such changes in the precise embodiment of the hereindescribed invention may be made as come within the scope of the claims.

The accompanying drawings illustrate one complete example of the physical embodiment of the invention constructed in accordance with the best mode so far devised for the practical application of the principles thereof, and in which.

Referring now particularly to the accompanying drawings the numeral 5 designates what may be termed a reference disc and which is the smallest of the several disc-like members which together comprise the essential parts of the device. Beneath the reference disc 5 and concentric thereto is an intermediate disc 6 and a disc-like member 7 cut out in the center so that it would be more properly termed a ring.

Figure 1:
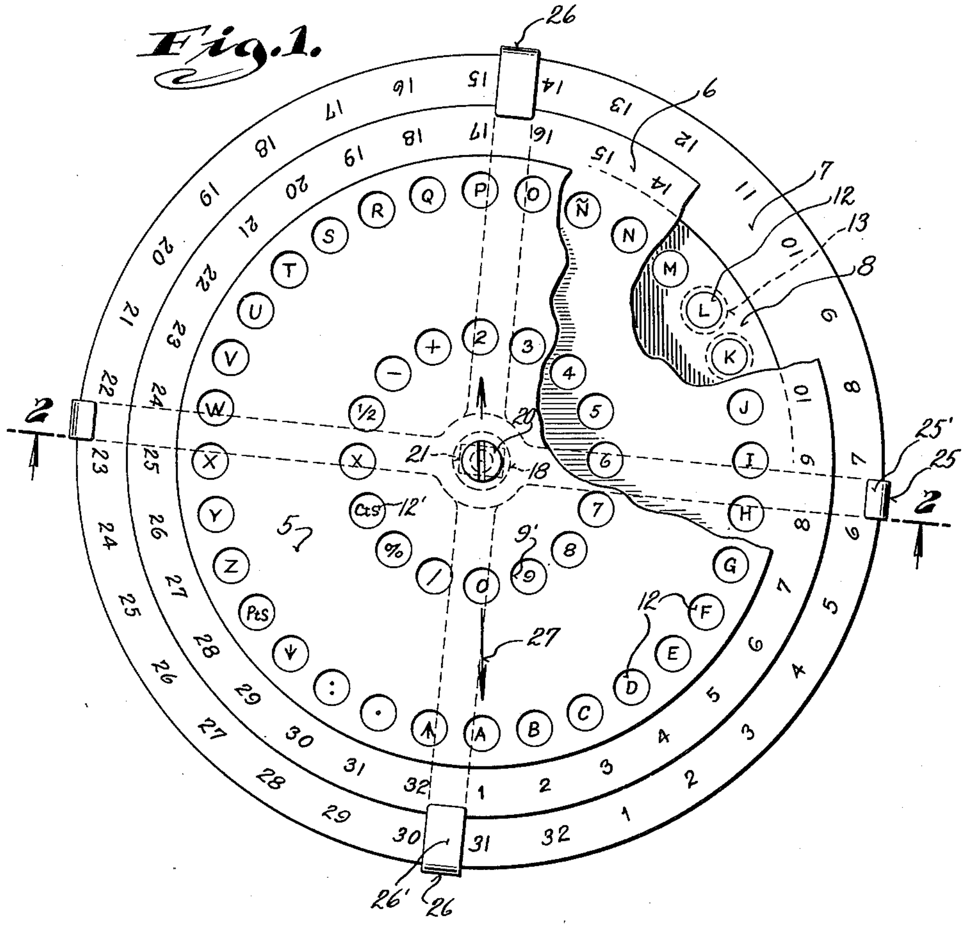
Figure 1 is a plan view of the device.
Figure 2:
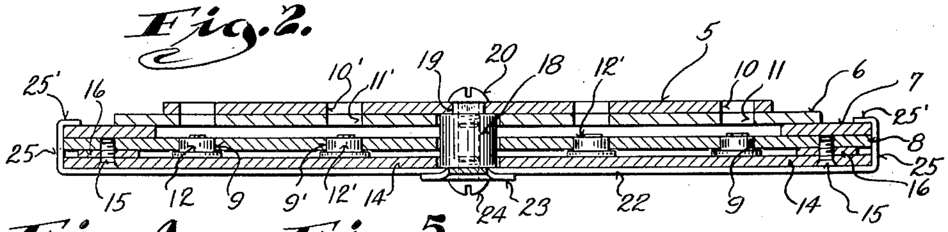
Figure 2 is a cross sectional view thereof on the plane of the line 2—2 in Figure 1.
Figure 4:
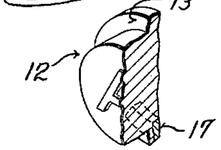
Figure 4 is an enlarged perspective view of one of the letter carrying elements or buttons.
Figure 5:
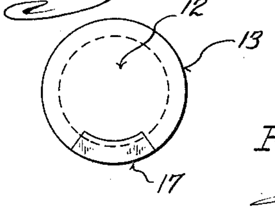
Figure 5 is a back view of a letter carrying element or button.
Figure 3:
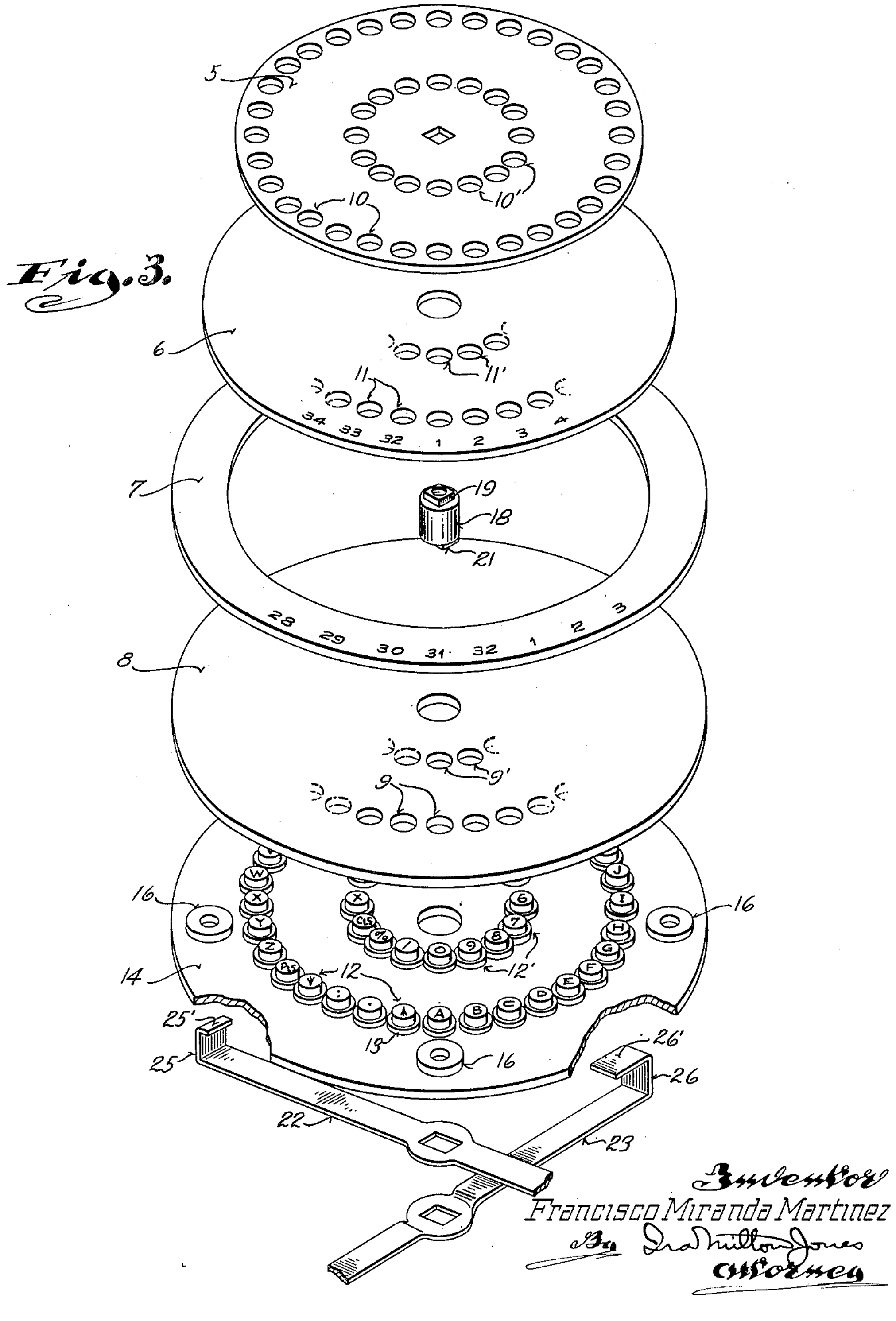
Figure 3 is an exploded perspective view of the various parts of the device.

The disc 6 and the ring 7 each has a series of numbers or other suitable cryptographic characters delineated around its marginal portion to be visible from the top as shown in Figure 1.

Beneath the ring 7 is a letter carrying disc or base member 8 provided with a series of holes 9 arranged in a circle having a diameter somewhat smaller than the diameter of the reference disc 5. The discs 5 and 6 have similar circular series of holes 10 and 11 respectively adapted to be coaxially aligned with one another and with the holes 9. The ring 7 has no such holes but its inside diameter is sufficiently large so that the ring does not extend across the aligned holes 9, 10 and 11.

The holes 9 provide sockets for flanged buttons 12 removably received therein with their flanges 13 bottom-most. The top of each button has a different letter or other intelligence conveying character delineated thereon and preferably formed in relief. The buttons 12 are held assembled with the carrier disc or base 8 by means of a circular retainer plate or disc 14 removably held in place by screws 15.

Attention is directed to the fact that spacers 16 are interposed between the discs 8 and 14 to space the same a distance slightly greater than the thickness of the button flanges 13. Hence, the buttons are retained in their respective sockets 9 in a manner permitting each button to revolve freely. This arrangement plus the fact that each individual button is eccentrically weighted as at 17 automatically brings all of the buttons into positions at which the letters or other intelligence conveying characers thereon stand upright when the device is held in a vertical position.

The several disc-like elements of the device are held in concentric relationship to one another by a central post 18 which passes freely through the discs 6, 8 and 14 but is non-rotatably secured to the top disc 5. For this latter purpose a square boss 19 projects from the post to be received in a similarly shaped hole in the disc 5 and a screw 20 holds the disc in place. A rectangular boss 21 extends down from the bottom of the post to be received in correspondingly shaped holes in two cross bars 22 and 23 so that these cross bars are held against rotation with respect to each other and with respect to the post 18 and the top disc 5. A screw 24 clamps the cross bars to the bottom of the post 18.

The outer ends of the cross bars 22 and 23 are bent upwardly as at 25 and 26 respectively and thus coact to hold the ring-like member 7 in position. The upturned outer ends 25 are bent over the ring 7 as at 25′ and the upturned outer ends 26 are bent over the marginal edge of the disc 6 as at 26′. The engagement of the portions 25′ and 26′ over their respective ring and disc members frictionally holds these members against rotation, but as will be readily apparent whenever it is desired to readjust the relative positions of the discs and ring members 5, 6, 7 and 8, the members 6, 7 and 8 can be rotated against this frictional grip.

The way in which the device is used to practice the method defined at length in the copending application, Serial No. 98,005, will be obvious to those familiar with this method and since the present invention concerns only the apparatus or device as distinguished from the method no detailed description of the method or manner of using the apparatus is here required. Briefly if the Spanish words "cada dia" are to be enciphered through use of the device of this invention and by prearrangement, as in accordance with the method fully described in the aforesaid application, each letter is to be represented by a number chosen alternately from those delineated on the disc 6 and ring 7, the enciphered words would be written 3.31.4.31-4.7.1, the first number having been chosen from the series delineated on the disc 6.

As will be readily apparent the device is so constructed as to lend itself readily to a wide range of variable conditions. For instance, by rotating the disc 6 and ring 7 with respect to each other the numbers delineated thereon can be brought into alignment with other letters or intelligence conveying characters, and if the greater security of having the letters arranged in an irregular sequence is required, this desideratum can be quickly and easily accommodated by the device of this invention since the individual buttons 12 are readily removable from their sockets.

To effect such removal and rearrangement of the locations of the letters and intelligence conveying characters it is only necessary to undo the screw 24, remove the cross members 25 and 26 and upon removal of the screws 15 lift off the retainer plate 14. This exposes all of the buttons which then can be lifted out of their sockets and replaced in any desired order.

To facilitate the use of the apparatus the reference disc 5 which does not turn, preferably has an arrow 27 delineated thereon to establish a reference point; and if desired another series of cryptographic characters can be provided for by means of buttons 12′ mounted in sockets 9′ in the carrier disc or base 8 but on a smaller circle as shown. The characters delineated on these buttons 12′ being visible through aligned holes 10′ and 11′ in the discs 5 and 6.

By prearrangement parts of the communication can be enciphered using the characters of this smaller circle of buttons 12′.

The raised or relief disposition of the letters or other intelligence conveying characters on the buttons 12 and 12′ facilitates the obtention of an imprint of letters or other intelligence conveying characters, which may be forwarded to the recipient to apprise him of the order in which the letters or other intelligence conveying characters are arranged.

From the foregoing description taken in connection with the accompanying drawings it will be readily apparent that the device of this invention provides an exceptionally facile expedient for the practice of the method of enciphering and deciphering cryptographic communications more fully described in the aforesaid copending application, Serial No. 98,005, filed June 9, 1949.

What I claim as my invention is:

1. A device for enciphering and deciphering cryptographic communications comprising: letter carrying means providing a series of letters and intelligence conveying characters arranged in a predetermined sequence, said letter carrying carrying means comprising a member having a series of pockets therein and a plurality of individual buttons upon which the letters and intelligence conveying characters are delineated, each removably received in one of said pockets with the letters and characters thereon facing outwardly; a plurality of other carrier members each carrying a series of cryptographic characters arranged in a predetermined sequence; and means connecting said carrier members with the series of letters and intelligence conveying characters in lateral juxtaposition to each series of cryptographic characters, and with a cryptographic character from each series thereof in line with a letter or intelligence conveying character.

2. The device defined in claim 1 further characterized by the fact that said carrier members are connected together in such manner that like cryptographic characters of the different series thereof are in line with different letters or intelligence conveying characters.

3. The apparatus defined in claim 1 further characterized by the fact that said carrier members are relatively movable to one another and to the letter carrying means in directions effecting shifting of the several series of characters with respect to each other.

4. An apparatus for enciphering and deciphering cryptographic communications comprising: a plurality of concentric superimposed disc members of different diameters having a series of cryptographic characters delineated along their marginal edges; a base member underlying the superimposed disc members, said base member having a series of pockets arranged in a circle smaller in diameter than the diameter of the smallest disc member and concentric therewith; individual buttons having intelligence conveying characters delineated thereon, each removably received in one of said pockets in the base member with the characters facing upwardly and visible through aligned openings in the members; and means for holding the disc members assembled concentrically with said base member for relative rotation about a common axis so that the different cryptographic characters of the different series thereof may be brought radially into line with the intelligence conveying characters in accordance with any prearranged relationship.

5. The apparatus defined in claim 4 further characterized by the fact that the pockets are round and that each individual button is freely rotatable in its pocket, and that each button is eccentrically weighted so that upon vertical disposition of the apparatus gravity rotates all of the individual buttons to automatically bring them into positions at which the intelligence conveying characters thereon are upright.

6. An apparatus for enciphering and deciphering cryptographic communications comprising: a plurality of concentric superimposed disc-like members of different diameters, one of said members having a series of circumferentially spaced pockets along its marginal edge; a plurality of individual elements upon which intelligence conveying characters are delineated, each removably received in one of said pockets with the characters thereon visible from one side of the apparatus; means delineating a series of cryptographic characters along the marginal edges of said disc-like members; and means for holding the disc-like members assembled for relative rotation about a common axis so that the cryptographic characters thereon may be brought radially into line with the intelligence conveying characters in accordance with any prearranged relationship.

FRANCISCO MIRANDA MARTINEZ.

REFERENCES CITED

The following references are of record in the file of this patent:

UNITED STATES PATENTS

| Number | Name | Date |
|---|---|---|
| 506,731 | Rothwell | Oct. 17, 1893 |
| 641,004 | Follansbee | Jan. 9, 1900 |
| 847,767 | Harlan | Mar. 19, 1907 |
| 875,070 | Haas | Dec. 31, 1907 |
| 1,138,807 | Spitler | Mar. 11, 1915 |
| 1,271,000 | Wulf | July 2, 1918 |
| 1,578,665 | Kontor | Mar. 30, 1926 |
| 1,671,758 | Appley | May 29, 1928 |

FOREIGN PATENTS

| Number | Country | Date |
|---|---|---|
| 311,598 | Italy | Oct. 5, 1933 |